US008995830B2

(12) United States Patent
Kikuzawa et al.

(10) Patent No.: US 8,995,830 B2
(45) Date of Patent: Mar. 31, 2015

(54) COMMUNICATION SYSTEM, OPTICAL NETWORK UNIT, OPTICAL LINE TERMINAL, CONTROL DEVICE, AND COMMUNICATION CONTROL METHOD

(75) Inventors: Takashi Kikuzawa, Tokyo (JP); Hiroaki Mukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 57 days.

(21) Appl. No.: 14/001,316

(22) PCT Filed: Feb. 25, 2011

(86) PCT No.: PCT/JP2011/054395
§ 371 (c)(1),
(2), (4) Date: Aug. 23, 2013

(87) PCT Pub. No.: WO2012/114526
PCT Pub. Date: Aug. 30, 2012

(65) Prior Publication Data
US 2013/0330074 A1 Dec. 12, 2013

(51) Int. Cl.
*H04B 10/08* (2006.01)
*H04B 10/079* (2013.01)
*H04L 12/12* (2006.01)

(52) U.S. Cl.
CPC .......... *H04B 10/07955* (2013.01); *H04L 12/12* (2013.01); *Y02B 60/34* (2013.01); *Y02B 60/32* (2013.01)
USPC ................. 398/38; 398/71; 398/72; 398/70

(58) Field of Classification Search
USPC .......... 398/71, 70, 72, 67, 66, 58, 38, 33, 171
See application file for complete search history.

(56) References Cited

U.S. PATENT DOCUMENTS 8,129,860 B2 * 3/2012 Houmaidi ........................ 307/64
8,855,563 B2 * 10/2014 Yamaoka et al. ............ 455/41.2
(Continued)

FOREIGN PATENT DOCUMENTS

JP 2005 151150 6/2005
JP 2008 118290 5/2008
(Continued)

OTHER PUBLICATIONS

International Search Report Issued Mar. 22, 2011 in PCT/JP11/54395 Filed Feb. 25, 2011.

*Primary Examiner* — M. R. Sedighian
(74) *Attorney, Agent, or Firm* — Oblon, McClelland, Maier & Neustadt, L.L.P.

(57) ABSTRACT

An ONU includes a power-interruption detecting unit configured to detect power interruption of the ONU, a transmitting and receiving unit capable of being set in a power saving state, and a PON-side control unit configured to notify an OLT of, as power saving return information, a power holding time during occurrence of the power interruption of the ONU and a startup time, which is time until the transmitting and receiving unit returns from the power saving state, and, when the power-interruption detecting unit detects the power interruption, transmit a power interruption notification to the OLT. The OLT includes the PON control unit configured to determine, based on the power saving return information, whether the ONU can transmit the power interruption notification when the power interruption occurs in the power saving state.

17 Claims, 12 Drawing Sheets

(56) References Cited

U.S. PATENT DOCUMENTS

2010/0111523 A1   5/2010  Hirth et al.
2013/0148972 A1*  6/2013  Kazawa et al. ............... 398/100

FOREIGN PATENT DOCUMENTS

| JP | 2010 193032 | 9/2010 |
| JP | 2010 200152 | 9/2010 |

* cited by examiner

FIG.14

| SETTING | | | | | ONU SLEEP MODE | | | | | | |
|---|---|---|---|---|---|---|---|---|---|---|---|
| POWER SAVING PREFERENCE SLEEP MODE | | | POWER INTERRUPTION NOTIFICATION PREFERENCE SLEEP MODE | | IMPOSSIBLE/ UNKNOWN | Tx POSSIBLE | | Tx/Rx POSSIBLE | | | |
| FIXED | | AUTO-MATIC | FIXED | AUTO-MATIC | | POWER INTERRUPTION NOTIFICATION POSSIBILITY DETERMINATION RESULT | | POWER INTERRUPTION NOTIFICATION | | | |
| Tx | Tx/Rx | | Tx | Tx/Rx | | | Tx POSSIBLE | IMPOSSIBLE/ UNKNOWN | Tx/Rx POSSIBLE | Tx POSSIBLE | IMPOSSIBLE/ UNKNOWN |
| ○ | | | | | | NONE | Tx | Tx | Tx | Tx | Tx |
| | | ○ | | | | NONE | — | — | Tx/Rx | Tx/Rx | Tx/Rx |
| | | | ○ | | | NONE | Tx | Tx | Tx | Tx | Tx |
| | | | | ○ | | NONE | NONE | NONE | Tx | NONE | NONE |
| | | | | | ○ | NONE | Tx | NONE | Tx/Rx | Tx | NONE |

COMMUNICATION SYSTEM, OPTICAL NETWORK UNIT, OPTICAL LINE TERMINAL, CONTROL DEVICE, AND COMMUNICATION CONTROL METHOD

FIELD

The present invention relates to a communication system, an optical network unit, an optical line terminal, a control device, and a communication control method.

BACKGROUND

Concerning power saving control (sleep control) in a PON (Passive Optical Network) system in the past, efficiency and a method for the power saving control have been discussed. For example, an OLT (Optical Line Terminal) transmits a control message to an ONU (Optical Network Unit) to set the ONU in a power saving state (a sleep mode) for a designated time. For example, Patent Literature 1 examines a method of performing automatic switching concerning whether both transmission and reception are set in the sleep mode or transmission is set in the sleep mode in the sleep control.

On the other hand, a system operator sometimes performs failure monitoring for a link failure or the like to perform communication management. In performing the failure monitoring, in some case, the system operator manages a power supply state of the ONU to perform the communication management. Consequently, in some case, the system operator performs, for example, isolation of a communication path failure.

CITATION LIST

Patent Literature

Patent Literature 1: United States Patent Publication No. 2010/0111523

SUMMARY

Technical Problem

In the PON system for carrying out the sleep control in the past, when the system operator manages power interruption, the ONU notifies the OLT of the power interruption. The ONU holds electric power using power holding means of the ONU for a fixed time from the power interruption and notifies the power interruption while the electric power is held. However, a capacitor or the like is often used as the power holding means. The power holding time is often a relatively short time. Therefore, when the ONU shifts to the sleep mode and detects power interruption in the power saving state (a state in which at least a part of transmission and reception functions is turned off), in some case, the ONU cannot notify the power interruption depending on a band update cycle or a characteristic peculiar to the ONU (a startup time of the transmission and reception functions from the power saving state). In the PON system for carrying out the sleep control in the past, there is a problem in that the OLT cannot grasp whether the OLT can acquire a power interruption notification when power interruption occurs in the sleep mode in ONUs connected to the OLT.

The present invention has been devised in view of the above and it is an object of the present invention to obtain a communication system, an optical network unit, an optical line terminal, a control device, and a communication control method for enabling the OLT to determine whether the OLT can acquire a power interruption notification from the ONU when power interruption occurs during sleep of the ONU.

Solution to Problem

There is provided a communication system according to an aspect of the present invention including: optical network units; and an optical line terminal configured to carry out band allocation to the optical network units, wherein at leastone of the optical network units includes: a power-interruption detecting unit configured to detect power interruption of the optical network unit; a transmitting and receiving unit capable of being set in a power saving state; and a subscriber-side control unit configured to notify the optical line terminal of, as power saving return information, a power holding time during occurrence of the power interruption of the optical network unit and a startup time, which is time until the transmitting and receiving unit returns from the power saving state, and, when the power-interruption detecting unit detects the power interruption, transmit a power interruption notification to the optical line terminal, and the optical line terminal includes a station-side control unit configured to carry out, based on the power saving return information, power interruption notification possibility determination, which is determination for determining whether the optical network unit at a transmission source of the power saving return information can transmit the power interruption notification when the power interruption occurs in the power saving state.

Advantageous Effects of Invention

The PON system according to the present invention realizes an effect that the OLT can grasp whether the OLT can acquire the power interruption notification from the ONU when power interruption occurs during sleep of the ONU.

BRIEF DESCRIPTION OF DRAWINGS

FIG. 14 is a diagram of an example of determination criteria for mode setting in a fourth embodiment.

DESCRIPTION OF EMBODIMENTS

Embodiments of a communication system, an optical network unit, an optical line terminal, a control device, and a communication control method according to the present invention are explained in detail below based on the drawings. The present invention is not limited by the embodiments.

First Embodiment.

Figure 1:
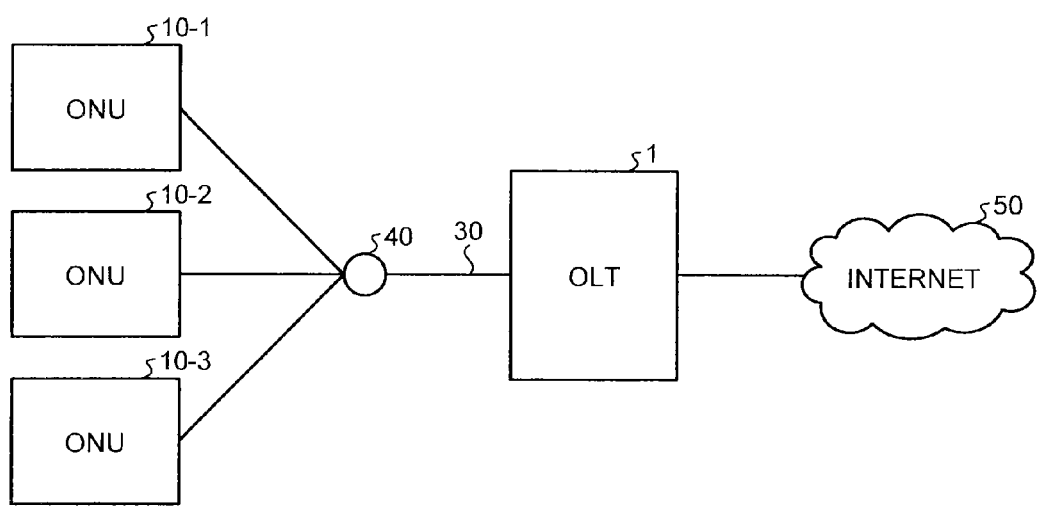
FIG. 1 is a diagram of a configuration example of a communication system in a first embodiment.

FIG. 1 is a diagram of a configuration example of a first embodiment of a communication system according to the present invention. As shown in FIG. 1, the communication system in this embodiment is configured as a PON system and includes an OLT 1 and ONUs 10-1 to 10-3. The OLT 1 is connected to the ONUs 10-1 to 10-3 by a subscriber line 30, which is an optical line, via a splitter 40. The OLT 1 is connected to, for example, the Internet 50. In the example shown in FIG. 1, there are three ONUs. However, the number of ONUs is not limited to three.

Figure 2:
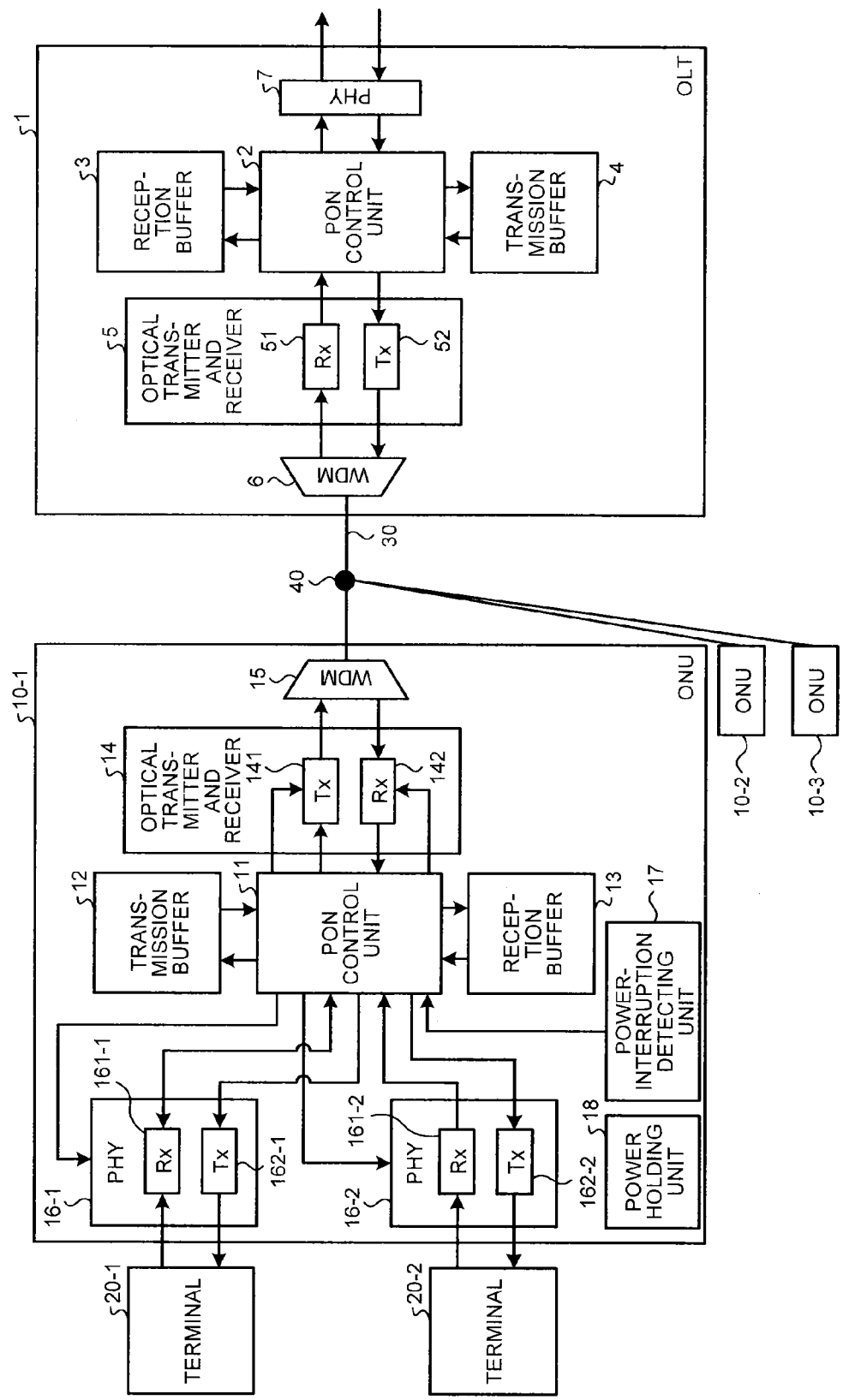
FIG. 2 is a diagram of a functional configuration example of an ONU and an OLT in the first embodiment.

FIG. 2 is a diagram of a functional configuration example of the ONU 10-1 and the OLT 1 in this embodiment. The configuration of the ONUs 10-2 and 10-3 is assumed to be the same as the configuration of the ONU 10-1. However, the ONUs 10-2 and 10-3 can have a configuration same as the configuration of the ONU in the past.

As shown in FIG. 2, the OLT 1 includes a PON control unit (a station-side control unit) 2 configured to carry out processing on an OLT side based on a PON protocol, a reception buffer 3 functioning as a buffer for storing uplink data received from the ONUs 10-1 to 10-3, a transmission buffer 4 functioning as a buffer for storing downlink data transmitted to the ONUs 10-1 to 10-3, an optical transmitter and receiver 5 configured to perform transmission and reception processing for an optical signal, a WDM (Wavelength Division Multiplexing) coupler 6 configured to wavelength-multiplex the uplink data and the downlink data, and a physical-layer processing unit (PHY) 7 configured to realize a physical interface function of an NNI (Network Node Interface) between the PHY 7 and a network. The optical transmitter and receiver (a transmitting and receiving unit) 5 includes an optical receiver (Rx: Receiver) 51 configured to perform reception processing and an optical transmitter (Tx: Transmitter) 52 configured to perform transmission processing.

The ONU 10-1 includes a PON control unit (a subscriber-side control unit) 11 configured to carry out processing on the ONU side based on a PON protocol, a transmission buffer (an uplink buffer) 12 functioning as a buffer for storing transmission data (uplink data) to the OLT 1, a reception buffer (a downlink buffer) 13 functioning as a buffer for storing reception data (downlink data) from the OLT 1, an optical transmitter and receiver 14, a WDM 15 configured to wavelength-multiplex the uplink data and the downlink data, physical-layer processing units (PHYs) 16-1 and 16-2 configured to respectively realize a physical interface function of a UNI (User Network Interface) between the PHYs 16-1 and 16-2 and terminals 20-1 and 20-2, a power-interruption detecting unit 17 configured to detect power interruption of the ONU 10-1, and a power holding unit 18 configured to hold electric power of the own device for a fixed time from power interruption.

The optical transmitter and receiver 14 includes an optical transmitter (Tx: Transmitter) 141 configured to perform transmission processing and an optical receiver (Rx: Receiver) 142 configured to perform reception processing. The PON control unit 11 is connected to the optical transmitter and receiver 14 by a signal line for power saving control to control any one of the optical transmitter 141 and the optical receiver 142 or both to be in an ON state/an OFF state.

The PHY 16-1 includes a receiving unit (Rx: Receiver) 161-1 configured to perform reception processing and a transmitting unit (Tx: Transmitter) 162-1 configured to perform transmission processing. The PHY 16-2 includes a receiving unit (Rx: Receiver) 161-1 configured to perform reception processing and a transmitting unit (Tx: Transmitter) 162-2 configured to perform transmission processing.

There are two terminals connected to the ONU 10-1. However, the number of terminals is not limited to this and can be any number. The ONU 10-1 includes physical-layer processing units (PHYs) corresponding to the number of terminals.

Like the PON system in the past, the PON control unit 2 of the OLT 1 performs band allocation for uplink data to give transmission permissions respectively to the ONUs 10-1 to 10-3 such that transmission periods of time do not overlap and prevents collision of transmission data of the ONUs 10-1 to 10-3. For the band allocation, any method can be used. For example, Dynamic Bandwidth Allocation Algorithm described in 'Su-il Choi and Joe-doo, "HuhDynamic Bandwidth Allocation Algorithm for Multimedia Services over Ethernet (registered trademark) PONs", ETRI Journal, Volume 24, Number 6, December 2002, p. 465 to p. 466' can be used.

In this embodiment, it is assumed that the PON control unit 2 carries out the band allocation to the ONUs 10-1 to 10-3 in a fixed band update cycle unit. The PON control unit 2 transmits a Gate frame (transmission permission information) at every band update cycle to thereby notify the ONUs 10-1 to 10-3 of a transmission permission time band at the next band update cycle or band update cycles subsequent to the next band update cycle as an allocation result. The allocation result notified by the Gate frame includes transmission permission time bands for transmitting Report frames (band allocation results) for the ONUs 10-1 to 10-3 to respectively perform band requests.

In each of the ONUs 10-1 to 10-3, the PON control unit 11 controls, based on the transmission permission time band notified by the Gate frame, the ONU to transmit uplink data stored in the transmission buffer 12. The PON control unit 11 transmits a Report frame for requesting a band based on an amount of the uplink data stored in the transmission buffer 12 to the OLT 1.

Upon detecting power interruption of the ONU 10-1, the power-interruption detecting unit 17 of the ONU 10-1 notifies the PON control unit 11 of the detection of the power interruption. Upon being notified of the detection of the power interruption, the PON control unit 11 transmits a power interruption notification for notifying that the power interruption has occurred in the ONU 10-1 to the OLT 1.

In the communication system according to this embodiment, power saving control (sleep control) is carried out. When a shift to a sleep mode is instructed by the OLT 1 or the OLT 1 permits a shift to the sleep mode in response to requests for the shift to the sleep mode from the ONUs 10-1 to 10-3, the ONUs 10-1 to 10-3 shift to a power saving state. Power saving states to which the ONUs 10-1 to 10-3 can shift are different depending on device configurations, setting, and the like. States (modes) are conceivable in which, for example, at least a part of PON-side reception function units (which can include, for example, sections concerning downlink data reception of the optical receiver 142 and the like, a section Tx 162-2 can also be included) is set in the OFF state, at least a part of PON-side transmission function units (which can include, for example, sections concerning uplink data transmission of the optical transmitter 141 and the like, a section Rx 161-2 can also be included) is set in the OFF state, and both of the PON-side transmission function units and the PON-side reception function units are set in the OFF state.

In this embodiment, when the ONU 10-1 detects power interruption of the ONU 10-1, the ONU 10-1 transmits the power interruption notification to the OLT 1. However, when power interruption occurs when the ONU 10-1 is in the sleep state (the power saving state), the power interruption can be transmitted in some case and cannot be transmitted in other cases. Whether the power interruption notification can be transmitted depends on, for example, a band update cycle and a startup time for the transmission and reception functions from the power saving state of the ONU 10-1.

Figure 3:
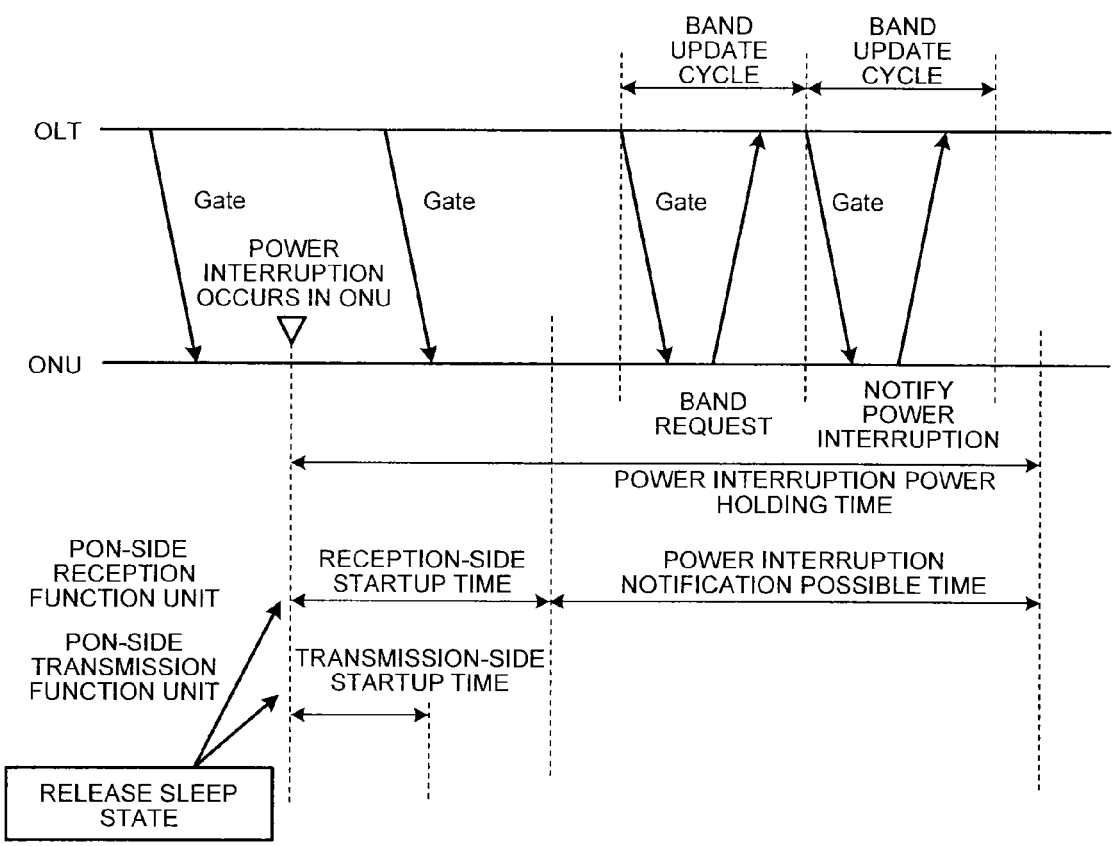
FIG. 3 is a diagram of an example in which a power interruption notification during sleep can be performed.
Figure 4:
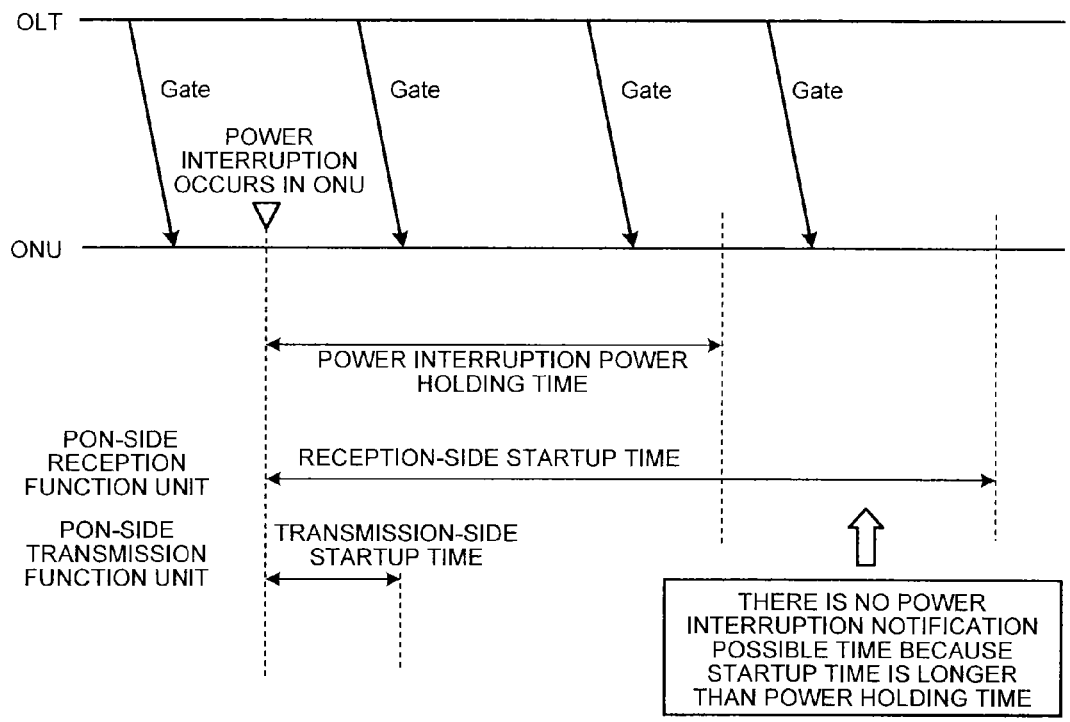
FIG. 4 is a diagram of an example in which the power interruption notification during sleep cannot be performed.

FIG. 3 is a diagram of an example in which the power interruption notification during sleep can be performed. FIG. 4 is a diagram of an example in which the power interruption notification during sleep cannot be performed. It is assumed that the OLT 1 transmits the Gate frame at every band update cycle even if the ONUs 10-1 to 10-3 are in the sleep mode. Bands allocated to the ONUs 10-1 to 10-3 in the sleep mode are bands for the ONUs 10-1 to 10-3 to transmit the Report frame.

In the case of the example shown in FIG. 3, when power interruption occurs in the ONU 10-1 in the power saving state (during sleep), the PON control unit 11 of the ONU 10-1 releases the sleep mode and starts up the section set in the OFF state. In the example shown in FIG. 3, the PON control unit 11 transmits, based on a Gate frame received first after an Rx startup time (a reception side startup time: time until a section stopped by changing to the sleep state among components of the ONU 10-1 that perform reception processing becomes operable) elapses, the report frame for requesting a band for transmitting the power interruption notification. In the example shown in FIG. 3, the Rx startup time is longer than a Tx startup time (a transmission side startup time: time until a section stopped by changing to the sleep state among components of the ONU 10-1 that perform transmission processing becomes operable). Therefore, the Report frame can be transmitted at a point when the Rx startup time elapses.

Upon receiving the Gate frame for notifying band allocation for transmitting the power interruption notification, the PON control unit 11 of the ONU 10-1 transmits the power interruption notification in a band (a transmission period of time) indicated by the Gate frame. In the example shown in FIG. 3, the power interruption notification is completed before a power interruption power holding time (time in which electric power can be held using the capacitor or the like from the power interruption) from the power interruption. Therefore, the power interruption notification during sleep can be performed.

On the other hand, in the example shown in FIG. 4, power interruption occurs in the ONU 10-1 in the power saving state as in the example shown in FIG. 3. Unlike the example shown in FIG. 3, the power interruption power holding time is shorter than the Rx startup time. Therefore, because the power holding time elapses before the power interruption notification is transmitted, the power interruption notification during sleep cannot be performed.

As explained above, the power interruption notification during sleep can be performed in some case and cannot be performed in other cases depending on a relation among the power interruption power holding time, the Rx startup time, the Tx startup time, the band update cycle, and the like. The OLT 1 in the past does not grasp the power interruption power holding time, the Rx startup time, and the Tx startup time. Therefore, the OLT 1 cannot grasp whether the ONUs 10-1 to 10-3 can perform the power interruption notification during sleep.

In this embodiment, the OLT 1 acquires parameters such as the power interruption power holding time, the Rx startup time, and the Tx startup time from the ONUs 10-1 to 10-3 to thereby determine whether the ONUs 10-1 to 10-3 can perform the power interruption notification during sleep (hereinafter referred to as power interruption notification possibility determination).

Figure 5:
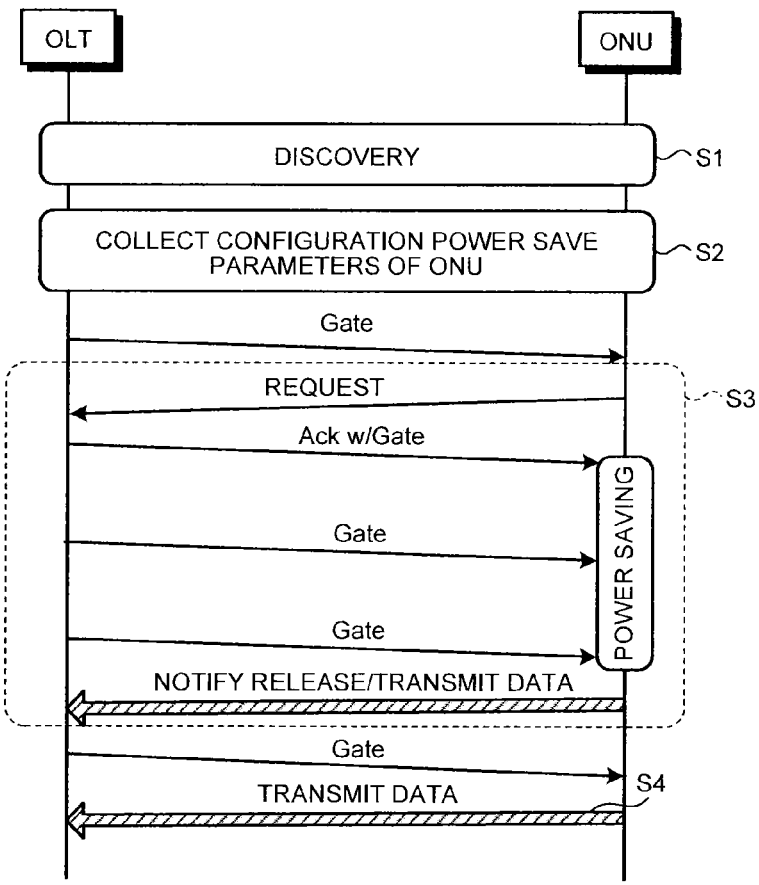
FIG. 5 is a chart of an example of a sleep control sequence in the first embodiment.

FIG. 5 is a chart of an example of a sleep control sequence in the communication system in this embodiment. As shown in FIG. 5, when the ONU 10-1 is connected to the OLT 1, a discovery sequence for exchanging information necessary for communication is carried out between the OLT 1 and the ONU 10-1 (step S1). Subsequently, the OLT 1 carries out collection of power save parameters, which are parameters concerning the sleep mode, from the ONU 10-1 and the power interruption notification possibility determination. The power save parameters include information concerning the sleep mode (mode information) that the ONU 10-1 can set, the power interruption power holding time, the Rx startup time, and the Tx startup time. The OLT 1 transmits, at every band cycle, the Gate frame for notifying a band allocation result.

When the collection of the power save parameters ends, the OLT 1 carries out sleep mode processing (step S3). Specifically, for example, the ONU 10-1 transmits a request for requesting a shift of the ONU 10-1 to the sleep mode and the OLT 1 returns Ack to the request, whereby the ONU 10-1 shifts to the sleep mode (the power saving state). Duration of the sleep mode is notified by the Ack. When the duration of the sleep mode elapses, the ONU 10-1 releases the sleep mode, transmits a release notification to the OLT 1, and starts data transmission. The OLT 1 can instruct the ONU 10-1 to shift to the sleep mode. After the sleep mode ends, the data transmission is performed in a normal mode (step S4). The sleep control sequence is explained using the ONU 10-1 as an example. However, the same sleep control sequence is carried out concerning the ONU 10-2.

Figure 6:
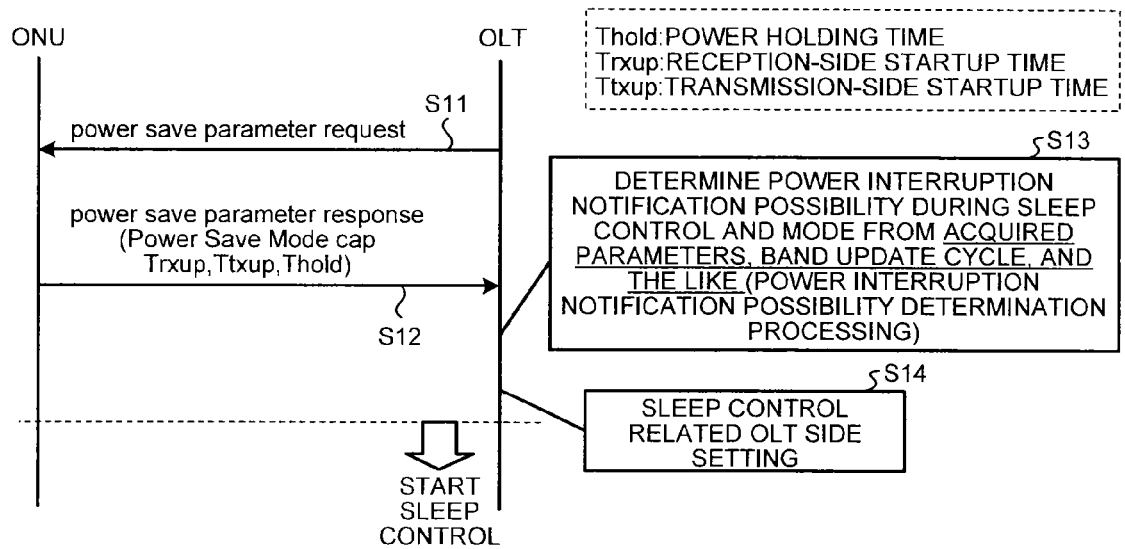
FIG. 6 is a chart of a sequence example of power save parameter acquisition and power interruption notification possibility determination processing in the first embodiment.

The power interruption notification possibility determination processing in this embodiment is explained. FIG. 6 is a chart of a sequence example of the power save parameter acquisition and the power interruption notification possibility determination processing in this embodiment. The OLT 1 transmits a power save parameter request for requesting acquisition of parameters (power save parameters) concerning the sleep mode to the ONUs 10-1 to 10-3, the ONUs being subjected to the power interruption notification possibility determination processing (step S11). The ONUs 10-1 to 10-3, which receive the power save parameter request, return power save parameter responses (step S12). In returning the power save parameter responses, the ONUs 10-1 to 10-3 store a settable sleep mode (Power Save Mode Cap.), power interruption related parameters (a power holding time (Thold), an Rx startup time (Trxup), and a Tx startup time (Ttxup)) in the power save parameter responses and transmit the power save parameter responses. The settable sleep mode (mode information) indicates any one of four modes concerning, for example, whether the ONUs 10-1 to 10-3 have a function of carrying out the sleep mode concerning both of Tx and Rx (a Tx/Rx mode), whether the ONUs 10-1 to 10-3 have a function of carrying out the sleep mode concerning only Tx (a Tx mode), whether the ONUs 10-1 to 10-3 have a function of carrying out the sleep mode concerning only Rx (an Rx mode), and whether the ONUs 10-1 to 10-3 are not adapted to the sleep mode at all.

The OLT 1 determines, based on the parameters concerning the sleep mode stored in the power save parameter response stored in the power save parameter response received from the ONUs 10-1 to 10-3, the band update cycle, and the like, whether the ONUs can transmit the power interruption notification during the sleep mode and determines, based on a determination result, whether the sleep mode of the ONUs is carried out (step S13).

When the sleep mode is carried out, the OLT 1 carries out setting concerning sleep control (step S14) and starts the sleep control.

Figure 7:
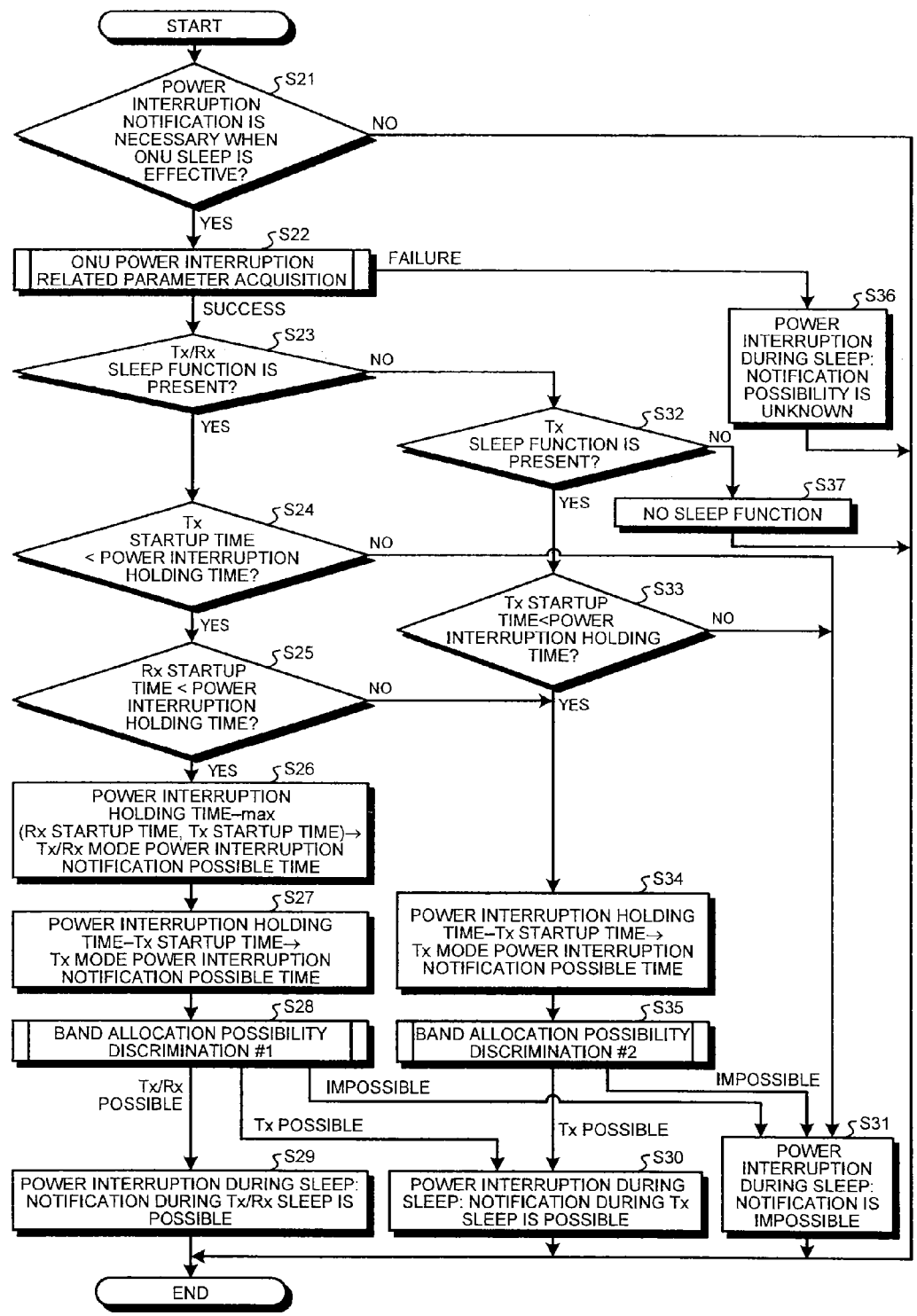
FIG. 7 is a flowchart for explaining an example of a power interruption notification possibility determination processing procedure in the first embodiment.

The power save parameter acquisition and a power interruption notification possibility determining operation in this embodiment in the OLT 1 are explained. FIG. 7 is a flowchart for explaining an example of a power interruption notification possibility determination processing procedure in this embodiment. For example, as shown in FIG. 5, the power save parameter acquisition and the power interruption notification possibility determination are carried out after the discovery sequence between the OLT 1 and the ONUs 10-1 to 10-3. Further, the power save parameter acquisition and the power interruption notification possibility determination are carried out when a parameter serving as a determination criterion for power interruption notification possibility determination is changed, for example, when the band update cycle is changed.

When the power interruption notification possibility determination is started, the PON control unit 2 of the OLT 1 determines whether it is necessary to receive notifications of power interruption from the ONUs 10-1 to 10-3 during sleep of the ONUs 10-1 to 10-3 (whether power interruption notifications are necessary) (step S21). For example, the PON control unit 2 determines whether it is necessary to receive notifications of power interruption even when the PON control unit 2 carries out failure monitoring or the like and the ONUs 10-1 to 10-3 are in sleep to perform failure isolation. In the following explanation, for convenience of explanation, possibility of the power interruption notification in the sleep mode is determined concerning the ONU 10-1. However, the same explanation applies to the ONUs 10-2 and 10-3.

When determining that the power interruption notification is unnecessary (No at step S21), the PON control unit 2 ends the processing. When determining that the power interruption notification is necessary (Yes at step S21), the PON control unit 2 acquires the mode information (Power Save Mode Cap.) and the power interruption related parameters from the ONU 10-1, which is subjected to the power interruption notification possibility determination processing, by, for example, transmitting a power save parameter request (step S22). All the ONUS are not always adapted to the notification of the power interruption related parameters. Therefore, in some case, the PON control unit 2 cannot acquire the power interruption related parameters. Therefore, when the power interruption related parameters cannot be acquired (failure at step S22), the PON control unit 2 determines that power interruption notification possibility during sleep is unknown (step S36) and ends the processing.

When the power interruption related parameters can be acquired (success at step S22), the PON control unit 2 determines, based on the mode information acquired from the ONU 10-1, whether the ONU 10-1 is adapted to both of Tx and Rx (has a Tx/Rx sleep function) (step S23). When the ONU 10-1 is adapted to both of Tx and Rx (Yes at step S23), the PON control unit 2 determines whether a Tx startup time of the ONU 10-1 is shorter than a power interruption holding time (a power holding time during power interruption) (step S24). When the Tx startup time is shorter than the power interruption holding time (Yes at step S24), the PON control unit 2 determines whether an Rx startup time of the ONU 10-1 is shorter than the power interruption holding time (step S25).

When the Rx startup time is shorter than the power interruption holding time (Yes at step S25), the PON control unit 2 calculates the power interruption holding time−max(the Rx startup time, the Tx startup time) as a Tx/Rx mode power interruption notification possible time (step S26). Note that max(a, b) indicates a larger value of a and b. Subsequently, the PON control unit 2 calculates the power interruption holding time−the Tx startup time as a Tx mode power interruption notification possible time (step S27). The PON control unit 2 carries out band allocation possibility discrimination #1 explained below (step S28). When a discrimination result indicates that the band allocation is possible for both of Tx and Rx (Tx-Rx possible at step S28), the PON control unit 2 determines that the power interruption notification is possible concerning the ONU 10-1 both during the sleep mode of Tx and during the sleep mode of Rx (step S29) and ends the processing.

When the discrimination result indicates that the band allocation is possible for only Tx (Tx possible at step S28), the PON control unit 2 determines that the power interruption notification during the sleep mode of Tx is possible concerning the ONU 10-1 (step S30) and ends the processing. When the discrimination result indicates that the band allocation is impossible (impossible at step S28), the PON control unit 2 determines that the power interruption notification during the sleep mode is possible concerning the ONU 10-1 (step S31) and ends the processing.

On the other hand, when determining at step S23 that the ONU 10-1 is not adapted to both of Tx and Rx (No at step S23), the PON control unit 2 determines whether the ONU 10-1 is adapted to the sleep mode of Tx (has a Tx sleep function) (step S32). When the ONU 10-1 is adapted to the sleep mode of Tx (Yes at step S32), the PON control unit 2 determines whether the Tx startup time of the ONU 10-1 is shorter than the power interruption holding time of the ONU 10-1 (step S33). When the Tx startup time is shorter than the power interruption holding time (Yes at step S33), the PON control unit 2 calculates the power interruption holding time−the Tx startup time as a Tx mode power interruption notification possible time (step S34). The PON control unit 2 carries out band allocation possibility discrimination #2 explained below (step S35). When a discrimination result indicates that the band allocation is possible for Tx (Tx possible at step S35), the PON control unit 2 proceeds to step S30. When the discrimination result indicates that the band allocation is impossible (impossible at step S35), the PON control unit 2 proceeds to step S31.

When the Tx startup time is equal to or longer than the power interruption holding time at step S24 (No at step S24), the PON control unit 2 proceeds to step S31. When the Rx startup time is equal to or longer than the power interruption holding time (No at step S25), the PON control unit 2 proceeds to step S34.

When determining at step S32 that the ONU 10-1 is not adapted to the Tx sleep (No at step S32), the PON control unit 2 determines that the ONU 10-1 is not adapted to the sleep modes of both Tx and Rx (step S37) and ends the processing. When the Tx startup time is equal to or longer than the power interruption holding time at step S33 (No at step S33), the PON control unit 2 proceeds to step S31.

Figure 8:
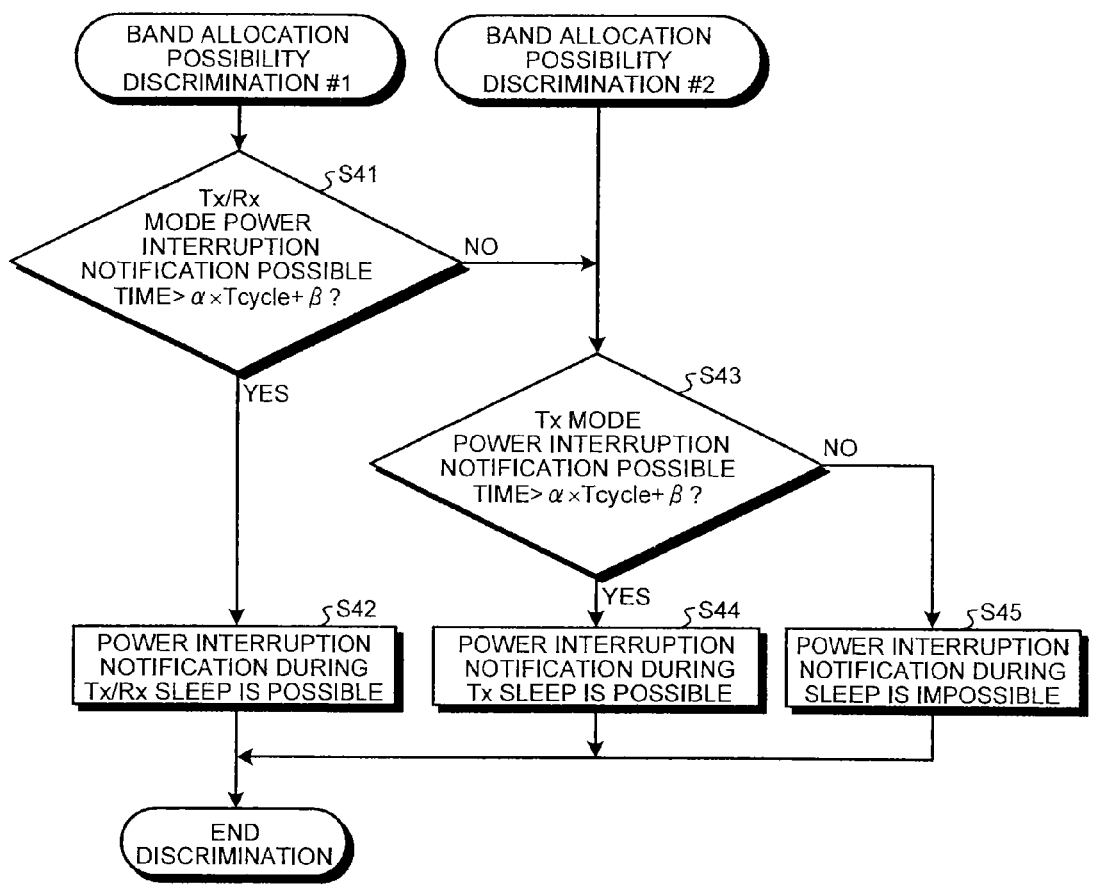
FIG. 8 is a flowchart for explaining an example of a band allocation possibility discrimination procedure in the first embodiment.

Band allocation possibility discrimination (the band allocation possibility discrimination #1 carried out at step S28 and the band allocation possibility discrimination #2 carried out at step S35) is explained. FIG. 8 is a flowchart for explaining an example of a band allocation possibility discrimination procedure in this embodiment. As shown in FIG. 8, when the band allocation possibility discrimination is started as the band allocation possibility discrimination #1, the PON control unit 2 determines whether the Tx/Rx mode power interruption notification possible time is larger than $\alpha \times Tcycle + \beta$ (step S41).

$\alpha$, Tcycle, and $\beta$ are explained. Tcycle is a band update cycle. It is assumed that the OLT 1 transmits the Gate frame for notifying allocated bands to the ONUs 10-1 to 10-3 at every band update cycle. It is assumed that the OLT 1 transmits the Gate frame to the ONUs 10-1 to 10-3 in the sleep mode as well. Bands notified to the ONUs 10-1 to 10-3 in the sleep mode by the Gate frame are bands for transmitting the Report frame. Therefore, when the ONUs 10-1 to 10-3 detect power interruption of the ONUs 10-1 to 10-3 during the sleep mode, the ONUs 10-1 to 10-3 cannot transmit power interruption notifications until bands for transmitting the power interruption notifications are allocated from the OLT 1.

Power interruption can be notified during sleep, for example, as shown in FIG. 3, the power holding time is longer than the Rx start time, the Tx startup time is shorter than the Rx startup time, and a series of processing for receiving the Gate frame, requesting a band for transmitting power interruption, and transmitting the power interruption can be carried out within time of a difference between the power holding time and the Rx startup time. Power interruption can be notified as well when the power holding time is longer than the Tx startup time, the Tx startup time is longer than the Rx startup time, and the series of processing for receiving the Gate frame, requesting a band for transmitting the power interruption notification, and transmitting the power interruption can be carried out within time of a difference between the power holding time and the Tx startup time.

In this embodiment, time obtained by subtracting a longer time of the Rx startup time and the Tx startup time from the power holding time is defined as power interruption power holding time. It is determined whether the series of processing for receiving the Gate frame, requesting a band for transmitting power interruption, and transmitting the power interruption notification can be carried out within the power interruption power holding time, whereby it is determined whether power interruption can be notified during sleep.

On the other hand, time for carrying out the series of processing for receiving the Gate frame, requesting a band for transmitting power interruption, and transmitting the power interruption is different depending on a system. When the ONU 10-1 receives the Gate frame within a certain band update cycle and transmits the Report frame for requesting a band for transmitting the power interruption notification, in some case, a band for the power interruption notification is allocated within the next band update cycle and, in other cases, a band for the power interruption notification is allocated within a band update cycle subsequent to the next band update cycle or the like. Therefore, in this embodiment, a total number of band update cycles necessary for the transmission of the Report frame to the transmission of the power interruption notification including the band update cycle in which the Report frame is indicated by the coefficient $\alpha$.

For example, as in the example shown in FIG. 3, when the Gate frame is received and the Report frame for requesting a band for transmitting the power interruption notification is transmitted within a certain band update cycle, $\alpha$ is 2 if a band for the power interruption notification is allocated within the next band update cycle.

$\beta$ is a coefficient that is set taking into account a difference between timing of the Gate frame reception in the ONU 10-1 and timing when a longer time of the Rx startup time and the Tx startup time elapses, other processing times, and the like. For example, when the power holding time is longer than the Rx startup time and the Tx startup time is shorter than the Rx startup time, if time when the Rx startup time elapses from power interruption is immediately after the start of a certain update cycle (e.g., immediately before reception of the Gate frame), the Report frame for requesting a band for the power interruption notification can be transmitted in the next band update cycle. However, when the power holding time is longer than the Rx startup time and the Tx startup time is shorter than the Rx startup time, for example, if the time when the Rx startup time elapses from power interruption is immediately before transmission of the Report frame in a certain band update cycle, processing for requesting a band for the power interruption notification cannot be performed within the band update cycle. $\beta$ only has to be set taking into account these delay elements based on a case in which a delay is the largest. For example, time for one band update cycle can be set as $\beta$.

Consequently, it is possible to determine whether the power interruption notification is possible during sleep by comparing the power interruption notification possible time (the Tx/Rx mode power interruption notification possible time or the Tx power interruption notification possible time) and $\alpha \times Tcycle + \beta$.

Referring back to FIG. 8, when the Tx/Rx mode power interruption notification possible time is larger than $\alpha \times Tcycle + \beta$ (Yes at step S41), the PON control unit 2 discriminates that the power interruption notification is possible during the sleep mode concerning both of Tx and Rx (Tx-Rx possible) (step S42) and ends the discrimination processing.

When determining at step S41 that the Tx/Rx mode power interruption notification possible time is not larger than $\alpha \times Tcycle + \beta$ (No at step S41), the PON control unit 2 determines whether the Tx mode power interruption notification possible time is larger than $\alpha \times Tcycle + \beta$ (step S43). When determining that the Tx mode power interruption notification possible time is larger than $\alpha \times Tcycle + \beta$ (Yes at step S43), the PON control unit 2 discriminates that the power interruption notification is possible during the sleep mode concerning Tx (Tx possible) (step S44) and ends the discrimination processing.

When determining at step S43 that the Tx mode power interruption notification possible time is not larger than $\alpha \times Tcycle + \beta$ (No at step S43), the PON control unit 2 discriminates that the power interruption notification is impossible during the sleep mode (impossible) (step S45) and ends the discrimination processing. When the band allocation possibility discrimination is started as the band allocation possibility discrimination #2, the PON control unit 2 carries out processing from step S43.

In the example explained above, the OLT 1 transmits the Gate frame to the ONU 10-1 even during the sleep mode of the ONU 10-1. However, the processing in this embodiment can be applied as well when the Gate frame is not transmitted to the ONU 10-1 during the sleep mode.

Figure 9:
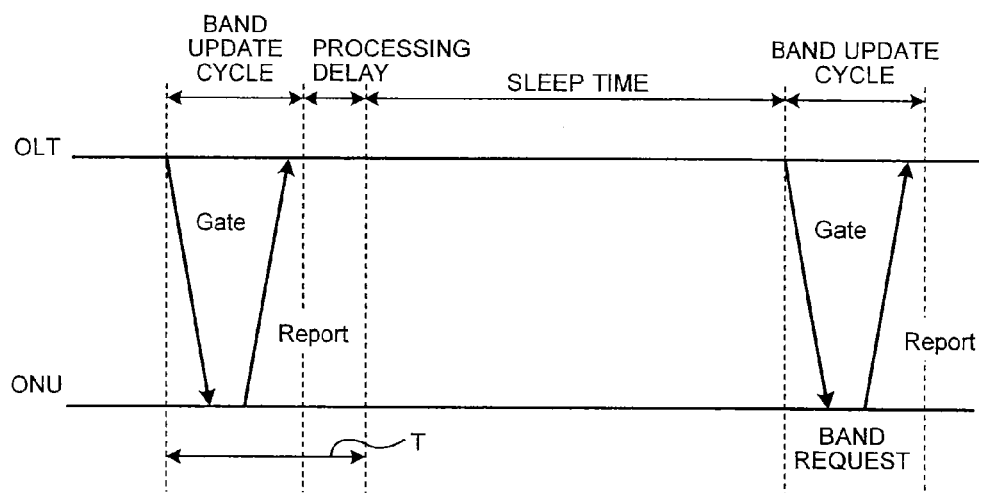
FIG. 9 is a diagram of an example of a maximum delay of a power interruption notification that occurs when a Gate frame is not transmitted to the ONU during a sleep mode.

FIG. 9 is a diagram of an example of a maximum delay of the power interruption notification that occurs when the Gate frame is not transmitted to the ONU 10-1 during the sleep mode. In time during which the ONU 10-1 shifts to the sleep mode (a sleep time) shown in FIG. 9, the ONU 10-1 does not receive the Gate frame. Therefore, the ONU 10-1 transmits the power interruption notification after the sleep time ends and the ONU 10-1 receives the Gate frame and transmits a band request for the power interruption notification. When power interruption occurs in one band update cycle before the shift to the sleep mode shown in FIG. 9 and during a processing delay after the band update cycle (a period T in FIG. 9), likewise, it is likely that the ONU 10-1 cannot transmit the power interruption notification until the sleep time ends and the ONU 10-1 receives the Gate frame.

Therefore, when the Gate frame is not transmitted to the ONU 10-1 during the sleep mode, instead of the determination criterion "α×Tcycle+β" explained with reference to FIG. 8, "α×Tcycle+sleep time+β'" only has to be used. The time T can be included in β'.

As explained above, in this embodiment, the ONU 10-1 transmits the power interruption related parameters (the power holding time, the Rx startup time, and the Tx startup time). The OLT 1 determines, based on the power interruption related parameters and the band update cycle, whether the power interruption notification is possible during sleep of the ONU 10-1. Therefore, the OLT 1 can grasp whether the OLT 1 can acquire the power interruption notification from the ONU when power interruption occurs during sleep of the ONU 10-1.

Second Embodiment.

Figure 10:
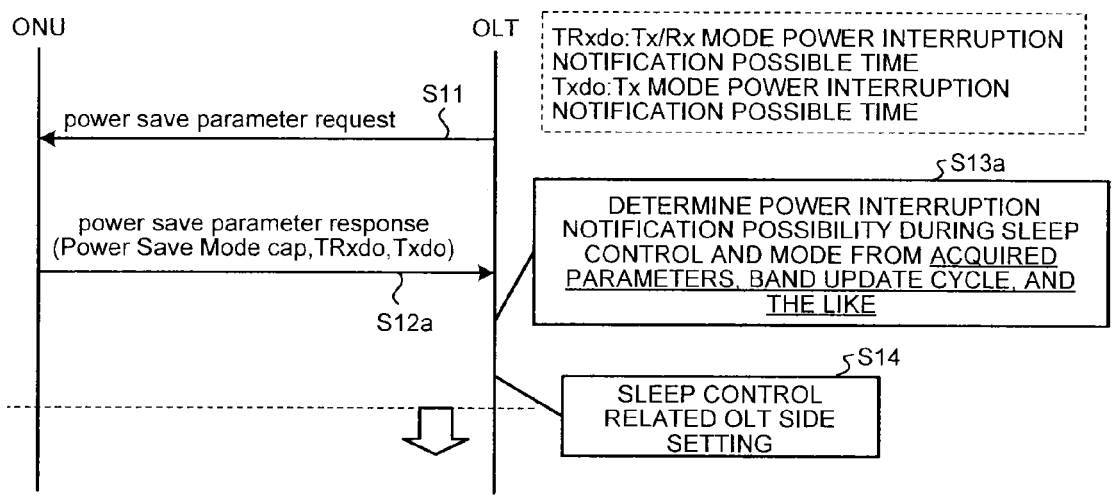
FIG. 10 is a chart of a sequence example of power save parameter acquisition and power interruption notification possibility determination processing in a second embodiment.

FIG. 10 is a chart of a sequence example of power save parameter acquisition and power interruption notification possibility determination processing in a second embodiment of the communication system according to the present invention. The configuration of the communication system in this embodiment is the same as that in the first embodiment. The configurations of the OLT 1 and the ONU 10-1 in this embodiment are the same as those in the first embodiment.

In the first embodiment, the OLT 1 acquires the power interruption related parameters (the power holding time, the Rx startup time, and the Tx startup time) from the ONU 10-1 and determines, based on the power interruption related parameters, possibility of the power interruption notification during sleep of the ONU 10-1. In the second embodiment, the ONU 10-1 calculates in advance, based on the power holding time, the Rx startup time, and the Tx startup time, as the power interruption related parameters, the power interruption notification possible time (the Tx/Rx mode power interruption notification possible time, the Tx mode power interruption notification possible time) explained in the first embodiment. Upon receiving a power save parameter request from the OLT 1 (step S11), the ONU 10-1 notifies the OLT 1 of a power save parameter response in which mode information (Power Save Mode Cap.) and the calculated power interruption notification possible time are stored (step S12*a*).

When the ONU 10-1 is adaptable to sleep modes of both of Tx and Rx, the ONU 10-1 calculates the Tx/Rx mode power interruption notification possible time and the Tx mode power interruption notification possible time and stores the Tx/Rx mode power interruption notification possible time and the Tx mode power interruption notification possible time in the power save parameter response. When the ONU 10-1 is adaptable to only the sleep mode of Tx, the ONU 10-1 calculates the Tx mode power interruption notification possible time and stores the Tx mode power interruption notification possible time in the power save parameter response.

The PON control unit 2 of the OLT 1 determines, base on the acquired power interruption notification possible time, the band update cycle, and the like, possibility of the power interruption notification during sleep (step S13*a*). In carrying out the sleep mode, the PON control unit 2 carries out setting concerning sleep control as in the first embodiment (step S14) and starts the sleep control.

Figure 11:
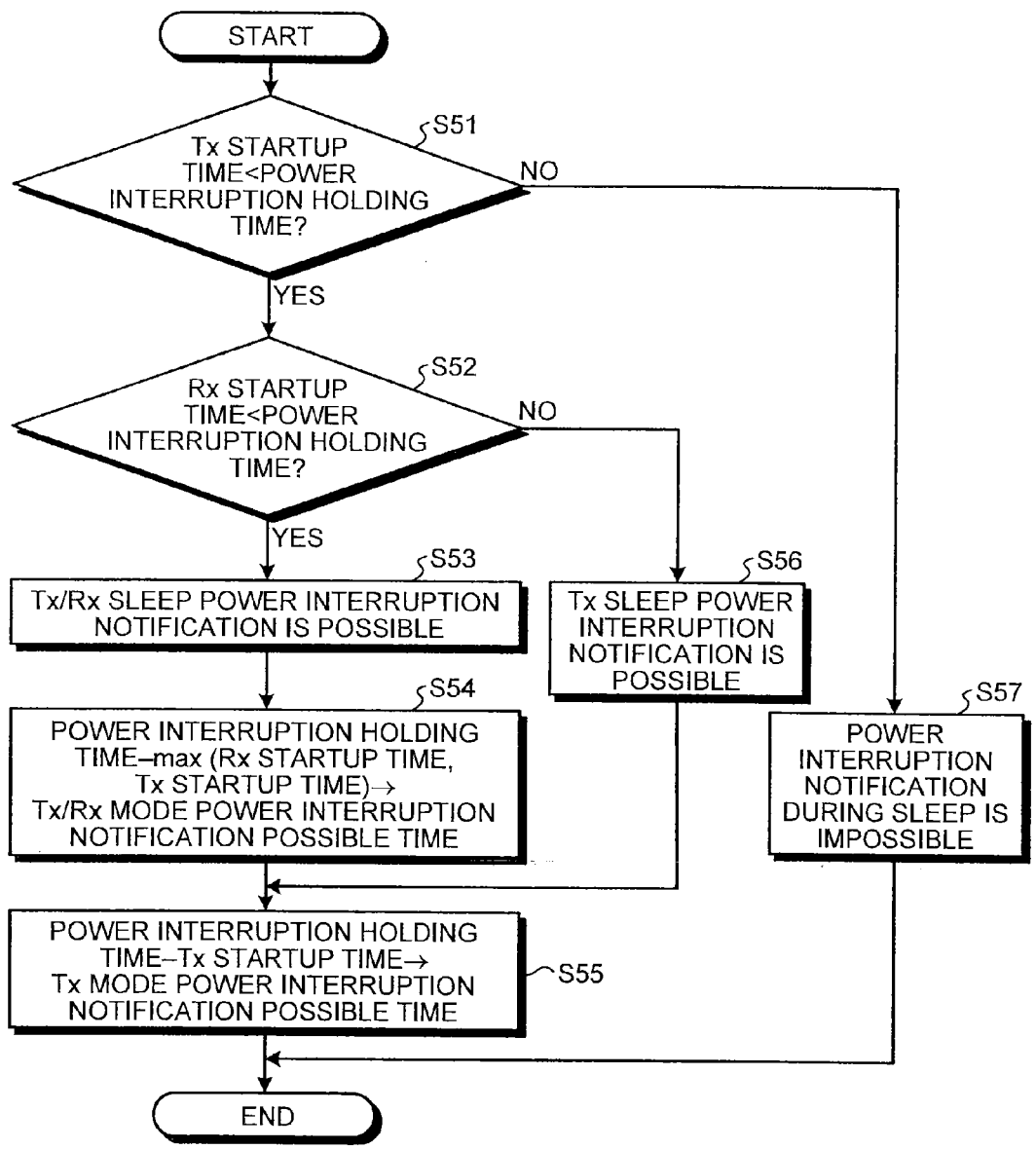
FIG. 11 is a diagram of an example of a power interruption notification possible time calculation processing procedure in an ONU in the second embodiment.

FIG. 11 is a diagram of an example of a power interruption notification possible time calculation processing procedure in the ONO 10-1 in this embodiment. FIG. 11 shows an example in which the ONU 10-1 is adaptable to the sleep modes of both of Tx and Rx. When the ONU 10-1 is adaptable to the sleep mode of only Tx, the ONU 10-1 only has to subtract the Tx startup time from the power holding time to calculate the Tx power interruption notification possible time. When the Tx start time is longer than the power holding time, the ONU 10-1 sets the Tx power interruption notification possible time to a predetermined value (e.g., 0).

As shown in FIG. 11, first, the PON control unit 11 of the ONU 10-1 determines whether the Tx startup time is shorter than the power interruption holding time (step S51). When the Tx startup time is shorter than the power interruption holding time (Yes at step S51), the PON control unit 11 determines whether the Rx startup time is shorter than the power interruption holding time (step S52).

When the Rx startup time is shorter than the power interruption holding time (Yes at step S52), the PON control unit 11 determines that the power interruption notification is possible in both of Tx and Rx (step S53) and calculates the power interruption holding time−max(the Rx startup time, the Tx startup time) as the Tx/Rx mode power interruption notification possible time (step step S54). Subsequently, the PON control unit 11 calculates the power interruption holding time−the Tx startup time as the Tx mode power interruption notification possible time (step S55) and ends the processing.

When determining at step S51 that the Tx startup time is equal to or longer than the power interruption holding time (No at step S51), the PON control unit 11 determines that the power interruption notification during sleep is impossible, sets the Tx/Rx power interruption notification possible time and the Tx power interruption notification possible time to a predetermined value (e.g., 0) (step S57), and ends the processing.

When determining at step S52 that the Rx startup time is equal to or longer than the power interruption holding time (No at step S52), the PON control unit 11 determines that the power interruption notification during sleep of Tx is possible, sets the Tx/Rx power interruption notification possible time to a predetermined value (e.g., 0) (step S56), and proceeds to step S55.

The PON control unit 2 of the OLT 1 carries out band allocation possibility discrimination based on the mode information and the power interruption notification possible time received from the ONU 10-1. Specifically, when the ONU 10-1 is adapted to the sleep modes of both of Tx and Rx and both of the Tx/Rx mode power interruption notification possible time and the Tx mode power interruption notification possible time are not the predetermined value (e.g., 0), the PON control unit 2 carries out the band allocation possibility discrimination #1 explained in the first embodiment. When the ONU 10-1 is adapted to the sleep modes of both of Tx and Rx, and the Tx/Rx mode power interruption notification possible time is not the predetermined value (e.g., 0) and the Tx mode power interruption notification possible time is the predetermined value (e.g., 0), the PON control unit 2 carries out the band allocation possibility discrimination #2 explained in the first embodiment. When the ONU 10-1 is adapted to the sleep mode of Tx and the Tx mode power interruption notification possible time is not the predetermined value (e.g., 0), the PON control unit 2 carries out the band allocation possibility discrimination #2.

The PON control unit 2 determines, based on results of these band allocation possibility discriminations, possibility of the power interruption notification during sleep of the ONU 10-1. Operations in this embodiment other than the operations explained above are the same as those in the first embodiment.

As explained above, in this embodiment, the ONU 10-1 calculates the power interruption notification possible time and notifies the OLT 1 of the power interruption notification possible time. The OLT 1 determines possibility of the power interruption notification during sleep of the ONU 10-1 using the notified power interruption notification possible time. Therefore, an effect same as the effect in the first embodiment is obtained. Further, it is possible to reduce processing time of the OLT 1.

Third Embodiment.

Figure 12:
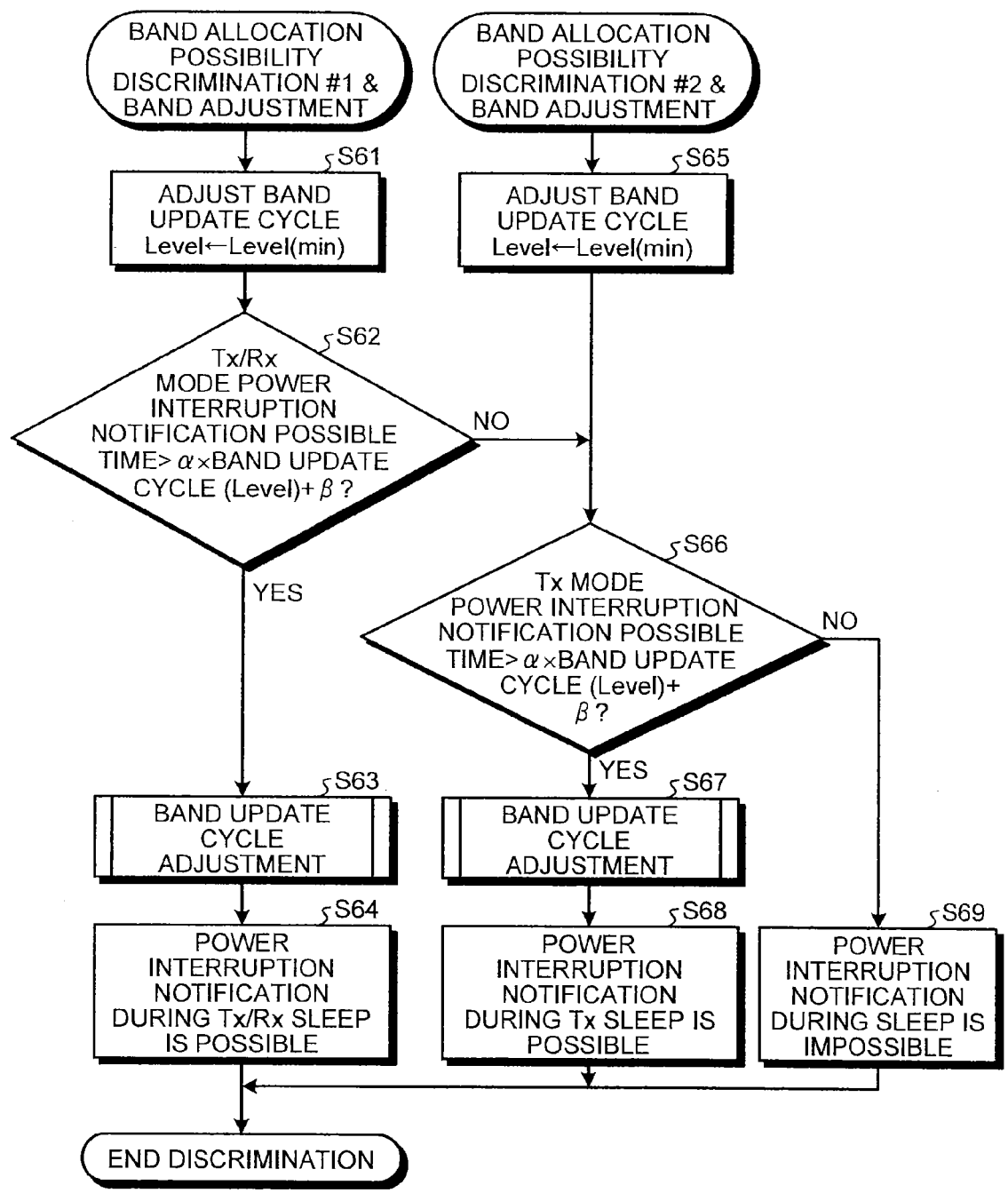
FIG. 12 is a flowchart for explaining an example of band allocation possibility discrimination and a band update cycle adjustment processing procedure in a third embodiment.

FIG. 12 is a flowchart for explaining an example of band allocation possibility discrimination and a band update cycle adjustment processing procedure in a third embodiment of the communication system according to the present invention. The configuration of the communication system according to this embodiment is the same as that in the first embodiment. The configurations of the OLT 1 and the ONU 10-1 in this embodiment are the same as those in the first embodiment.

In this embodiment, instead of the band allocation possibility discrimination #1 and the band allocation possibility discrimination #2 explained at steps S28 and S35 in FIG. 7 in the first embodiment, the band allocation possibility discrimination #1 and band update cycle adjustment and the band allocation possibility discrimination #2 and band update cycle adjustment are carried out. That is, a band update cycle is adjusted such that a power interruption notification can be carried out as much as possible when band allocation possibility discrimination is performed. Possibility of the power interruption notification during sleep is discriminated after the band update cycle is adjusted. Power interruption notification possibility determination processing in this embodiment other than steps S28 and S35 is the same as that in the first embodiment.

As shown in FIG. 12, in this embodiment, when processing is started as the band allocation possibility discrimination #1 and the band update cycle adjustment, first, the PON control unit 2 sets a level of the band update cycle to Level(min) corresponding to a shortest band update cycle (step S61). In the communication system in this embodiment, it is assumed that the communication system has two or more stages of Levels of the band update cycle and the length of the band update cycle is different for each of the Levels. It is assumed that the Levels take continuous integer values and, for example, the band update cycle is longer as the Level is larger, for example, Levels 1, 2, and 3 respectively correspond to band update cycles 300 μs, 500 μs, and 1 ms.

Subsequently, the PON control unit 2 determines whether the Tx/Rx mode power interruption notification possible time is larger than α× band update cycle (Level)+β (step S62). The band update cycle (Level) indicates a band update period corresponding to Level in parentheses.

When the Tx/Rx mode power interruption notification possible time is larger than α× band update cycle (Level)+β (Yes at step S62), the PON control unit 2 sets the Rx/Tx mode power interruption notification possible time as power interruption notification possible time and carries out band update cycle adjustment processing explained below (step S63), determines that the power interruption notification during the Tx/Rx sleep is possible (the power interruption notification is possible during sleep of both of Tx and Rx) (step S64), and ends processing.

When the Tx/Rx mode power interruption notification possible time is equal to or smaller than α× band update cycle (Level)+β (No at step S62), the PON control unit 2 determines whether the Tx mode power interruption notification possible time is larger than α× band update cycle (Level)+β (step S66).

When the Tx/Rx mode power interruption notification possible time is larger than α× band update cycle (Level)+β (Yes at step S66), the PON control unit 2 carries out band update cycle adjustment processing explained below with the Tx mode power interruption notification possible time set as the power interruption notification possible time (step S67), discriminates that the power interruption during Tx sleep is possible (step S68), and ends the processing.

When the Tx mode power interruption notification possible time is equal to or smaller than α× band update cycle (Level)+β at step S66 (NO at step S66), the PON control unit 2 discriminates that the power interruption notification during sleep is impossible (step S69), and ends the processing.

When processing is started as the band allocation possibility discrimination #2 and the band update cycle adjustment, as at S61, the PON control unit 2 sets the Level of the band update cycle to Level(min) corresponding to a shortest band update cycle (step S65) and, thereafter, proceeds to step S66.

Figure 13:
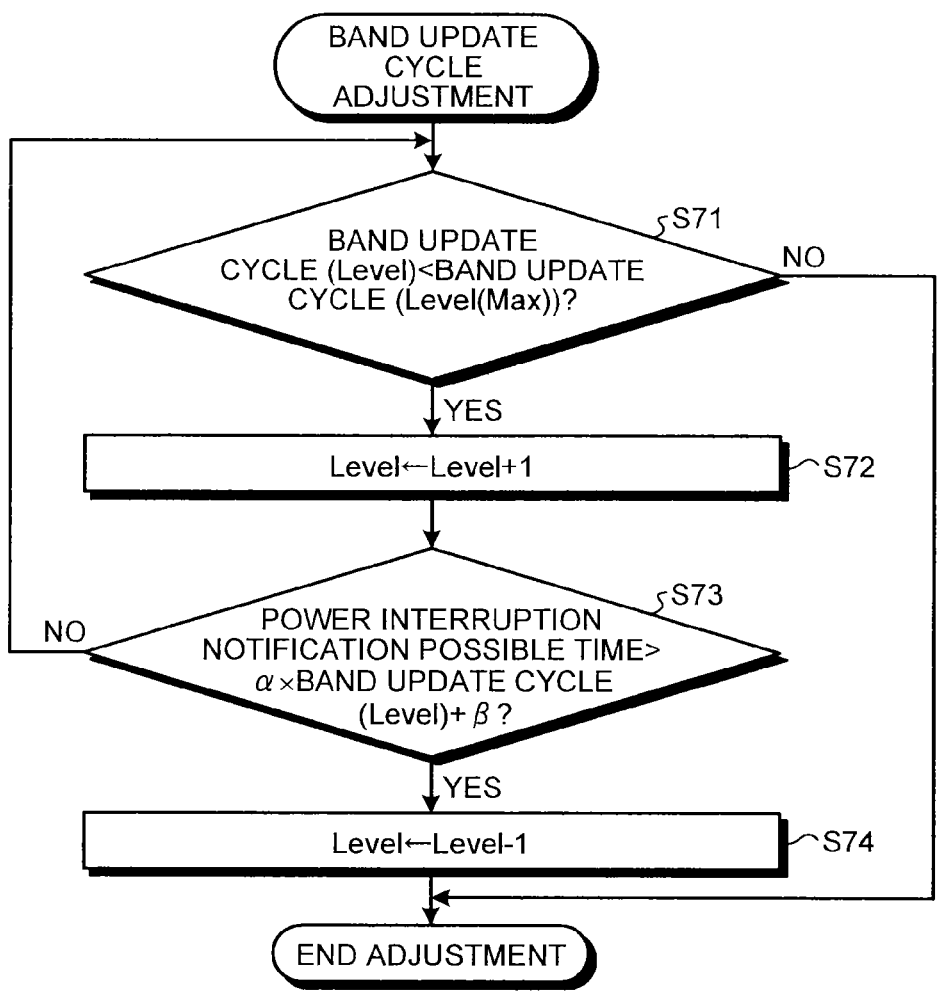
FIG. 13 is a flowchart for explaining an example of the band update cycle adjustment processing procedure in the third embodiment.

FIG. 13 is a flowchart for explaining an example of the band update cycle adjustment processing procedure in this embodiment. The band update cycle adjustment processing carried out at steps S63 and S67 is carried out, for example, according to a procedure shown in FIG. 13. First, the PON control unit 2 determines whether the band update cycle (Level) is smaller than a band update cycle (Level(Max)) (step S71). Level(Max) indicates Level corresponding to a longest band update cycle. When the band update cycle (Level) is equal to or larger than the band update cycle (Level (Max)) (No at step S71), the PON control unit 2 ends the band update cycle adjustment processing.

When the band update cycle (Level) is smaller than the band update cycle (Level(Max)) (Yes at step S71), the PON control unit 2 increases the Level by 1 (step S72) and determines whether the power interruption notification possible time is smaller than α× band update cycle (Level)+β (step S73).

When the power interruption notification possible time is smaller than α× band update cycle (Level)+β (Yes at step S73), the PON control unit 2 decreases the Level by 1 (step S74) and ends the band update cycle adjustment processing. When the power interruption notification possible time is equal to or larger than α× band update cycle (Level)+β at step S73 (No at step S73), the PON control unit 2 returns to step S71.

As explained above, in this embodiment, the band update cycle is adjusted to set the band update cycle longest in a range in which the power interruption notification can be performed during sleep. By changing the band update cycle in this way, it is more highly likely that the OLT 1 can receive the power interruption notification during sleep of the ONU 10-1. To perform efficient transmission, the band update cycle is adjusted to be longest in the range in which the power interruption notification can be performed during sleep. However, when the band update cycle after the adjustment is longer than the band update cycle set before the band update cycle adjustment processing, it is also possible to continuously use the band update cycle set before the band update cycle adjustment processing is performed without using the band update cycle after the adjustment.

The operation in this embodiment explained above is the same as that in the first embodiment. When the ONU 10-1 calculates the power interruption notification possible time as in the second embodiment, the band update cycle adjustment explained in this embodiment can be performed.

As explained above, in this embodiment, the OLT 1 adjusts the band update cycle such that the ONU 10-1 can perform the power interruption notification as much as possible during sleep. Therefore, compared with the first embodiment, it is possible to increase the likelihood that the power interruption notification can be received. When it is likely that the ONU 10-1 can perform the power interruption notification as much as possible during sleep, the OLT 1 adjusts the band update cycle to be set longest in the range in the which the power interruption notification can be performed as much as possible during sleep. Consequently, it is possible to improve transmission efficiency.

Fourth Embodiment.

A communication system according to a fourth embodiment of the present invention is explained. The configuration of the communication system according to this embodiment is the same as that in the first embodiment. The configurations of the OLT 1 and the ONU 10-1 in this embodiment are the same as those in the first embodiment.

In the method explained in the first to third embodiments, the OLT 1 determines possibility of the power interruption notification during sleep of the ONU 10-1. A system operator can perform setting of a sleep mode, setting of failure monitoring, and the like using results of the determination. The determination results can be displayed on a screen or the like. The system operator can input, based on the results, the setting of a sleep mode, the setting of failure monitoring, and the like. In an example explained in the fourth embodiment, determination criteria are set in advance and settings are automatically performed without requiring an input of the system operator.

FIG. 14 is a diagram of an example of determination criteria for mode setting in this embodiment. A column for setting in the left half of FIG. 14 indicates setting conditions selected by the system operator in advance. For example, it is assumed that the OLT 1 includes means for receiving an input from the system operator through remote operation. The OLT 1 receives an input of a selection result from the system operator. In this example, six setting conditions in total including three setting conditions concerning power saving preference and three setting conditions concerning a power interruption notification are defined. The system operator selects one setting condition out of the six setting conditions and sets the setting condition in the OLT 1. The setting condition can be selected for each of ONUs or can be selected in common for all the ONUs.

The setting conditions includes, concerning each of the power saving preference and the power interruption notification preference, three setting conditions, i.e., a setting condition for setting the sleep mode to Tx mode fixed (indicated by circles in a column of Tx of Fixed in FIG. 14), setting the sleep mode to mode for performing both of Tx and Rx (Tx/Rx mode) fixed (indicated by circles in a column of Tx/Rx of Fixed in FIG. 14), and setting the sleep mode to automatic (indicate by circles in a column of Automatic in FIG. 14).

The Tx mode fixed indicates that, when setting the ONU 10-1 to the sleep mode, the OLT 1 sets the ONU 10-1 to the Tx mode irrespective of the determination results of the power interruption notification possibility explained in the first to third embodiments. The Rx/Tx mode fixed indicates that, when setting the ONU 10-1 to the sleep mode, the OLT 1 sets the ONU 10-1 to the Tx/Rx mode irrespective of the determination results of the power interruption notification possibility explained in the first to third embodiments. The automatic indicates that the OLT 1 sets the sleep mode based on the determination results of the power interruption notification possibility.

The right half of FIG. 14 indicates the determination results of the determination of the power supply notification possibility explained in the first to third embodiments. The determination results are divided into three, i.e., the determination results obtained when a sleep mode (an ONU sleep mode) to which the ONU 10-1 is adaptable acquired by the OLT 1 from the ONU 10-1 is "impossible/unknown", when the sleep mode is "Tx possible", and when the sleep mode is "Tx/Rx possible (the power interruption notification is possible in both of Tx and Rx). When the ONU sleep mode is "impossible/unknown", the OLT 1 does not set the sleep mode (None in FIG. 14).

For example, when the ONU sleep mode is the Tx possible, the Tx mode is set when the sleep mode is prioritized and the setting condition is the Tx mode fixed, the Tx mode is not set when the sleep mode is prioritized and the setting condition is the Tx/Rx mode fixed, and the Tx mode is set when the sleep mode is prioritized and the setting condition is the Tx mode fixed. When the power interruption notification is prioritized and the setting condition is the Tx mode fixed, the Tx mode is set when the power interruption notification is the Tx possible and the sleep mode is not set when the power interruption notification is impossible/unknown. When the power interruption notification is prioritized and the setting condition is the Tx/Rx mode fixed, the sleep mode is not set both when the power interruption notification is the Tx possible and when the power interruption notification is impossible/unknown. When the power interruption notification is prioritized and the setting condition is the automatic, the Tx mode is set when the power interruption notification is the Tx possible and the sleep mode is not set when the power interruption notification is impossible/unknown.

The determination criteria shown in FIG. 14 are an example. Determination criteria for determining in which sleep mode the ONU 10-1 is set using the power interruption notification possibility determination results for each of the setting conditions are not limited to these determination criteria and can be any determination criteria. The system operator can change, as appropriate, the determination criteria and the setting conditions to be selected.

As explained above, in this embodiment, correspondence between the power interruption notification possibility determination results and the sleep modes to be set are determined in advance. The sleep mode is automatically set based on the power interruption notification possibility determination results. Therefore, an effect same as that in the first to third embodiment can be obtained. It is possible to appropriately carry out processing corresponding to a request (e.g., whether power saving is prioritized or reception of the power interruption notification is prioritized in operation) without complicating the operation by the system operator.

Fifth Embodiment.

A communication system according to a fifth embodiment of the present invention is explained. The configuration of the communication system according to this embodiment is the same as that in the first embodiment. The configurations of the OLT 1 and the ONU 10-1 in this embodiment are the same as those in the first embodiment.

In this embodiment, as in the fourth embodiment, determination criteria for determining in which sleep mode the ONU 10-1 is set are determined in advance based on power interruption notification possibility determination results. In this embodiment, further, the communication system is configured to enable a system operator to select whether the band update cycle adjustment processing explained in the third embodiment is carried out. When the communication system is set to not carry out the band update cycle adjustment processing, the communication system determines power interruption notification possibility without adjusting a band update cycle and, as in the fourth embodiment, sets the sleep mode according to the determination criteria and a determination result of the power interruption notification possibility. On the other hand, when the communication system is set to carry out the band update cycle adjustment processing, as in the third embodiment, the communication system adjusts the band update cycle and determines the power interruption notification possibility. Thereafter, as in the fourth embodiment, the communication system sets the sleep mode according to the determination criteria and the determination result of the power interruption notification possibility.

As explained above, in this embodiment, it is also possible to set whether the band update cycle adjustment processing is carried out. Therefore, an effect same as the effect in the fourth embodiment is obtained. Further, the system operator can select whether transmission efficiency is prioritized.

Sixth Embodiment.

A communication system according to a sixth embodiment of the present invention is explained. The configuration of the communication system according to this embodiment is the same as that in the first embodiment. The configurations of the OLT 1 and the ONU 10-1 in this embodiment are the same as those in the first embodiment.

In this embodiment, operation same as that in any one of the first to fifth embodiments is carried out. In the first to fifth embodiments, it is assumed that the power holding time of the ONU 10-1 is fixed. However, in some case, a power holding time during power interruption (a power interruption holding time) changes depending on aged deterioration and temperature dependency of a capacitor and the like.

In this embodiment, to detect such a change in the power interruption holding time, when it is predicted, using environment parameters that cause fluctuation in the power holding time such as temperature and elapsed time from manufacturing, that the power holding time has changed by a predetermined threshold or more, the ONU 10-1 notifies the OLT 1 to that effect. For example, the ONU 10-1 further includes means for notifying a change in the environment parameters and notifying the PON control unit 11 of the change. When an environment parameter exceeds a predetermined range, the PON control unit 11 notifies the OLT 1 that abnormality of the environment parameter occurs. When the environment parameter returns to the predetermined range from a state in which the environment parameter exceeds the predetermined range, the PON control unit 11 notifies the OLT 1 that the environment parameter returns to normal.

When the ONU 10-1 calculates a power interruption notification possible time as in the second embodiment, if a power holding time predicted from parameters is shorter than the power interruption notification possible time or if the power holding time is restored and is equal to or longer than the power interruption notification possible time, the ONU 10-1 can notify the OLT 1 to that effect.

Consequently, when the ONU 10-1 cannot perform the power interruption notification during sleep, it is possible to specify a cause thereof. In notification to the OLT 1, the ONU 10-1 notifies the OLT 1 of the environment parameters (the temperature, the elapsed time, etc.) as well using a control message. Alternatively, the ONU 10-1 periodically notifies the OLT 1 of the parameters. Consequently, the OLT 1 can grasp a state of the ONU 10-1. The ONU 10-1 can predict the power interruption notification possible time using the environment parameters and update the power interruption notification possible time to a predicted time and use the predicted time.

Seventh Embodiment.

In the explanation in the first to sixth embodiments, the communication system is the PON system. However, the operation explained in the first to sixth embodiments can be applied to a communication system other than the PON system. An effect same as that in the case of the PON system can be obtained as long as the communication system is a communication system in which a host apparatus allocates a transmission time to a subordinate apparatus.

REFERENCE SIGNS LIST

1 OLT
2, 11 PON control unit
3, 13 reception buffer
4, 12 transmission buffer
5, 14 optical transmitter and receiver
6, 15 WDM
7 PHY
10-1 to 10-3 ONU
16 PHY
17 power-interruption detecting unit
18 power holding unit
20-1, 20-2 terminal
30 subscriber line
40 splitter
51, 142, 161-1, 161-2 Rx
52, 141, 162-1, 162-2 Tx

The invention claimed is:

1. A communication system comprising: optical network units; and an optical line terminal configured to carry out band allocation to the optical network units, wherein
at least one of the optical network units includes:
a power-interruption detecting unit configured to detect power interruption of the optical network unit;
a transmitting and receiving unit capable of being set in a power saving state;
and
a subscriber-side control unit configured to notify the optical line terminal of, as power saving return information, a power holding time during occurrence of the power interruption of the optical network unit and a startup time, which is time until the transmitting and receiving unit returns from the power saving state, and, when the power-interruption detecting unit detects the power interruption, transmit a power interruption notification to the optical line terminal, and the optical line terminal includes a station-side control unit configured to carry out, based on the power saving return information, power interruption notification possibility determination, which is determination for determining whether the optical network unit at a transmission source of the power saving return information can transmit the power interruption notification when the power interruption occurs in the power saving state.

2. The communication system according to claim 1, wherein the station-side control unit calculates, as a power interruption notification possible time, a value obtained by subtracting the startup time from the power holding time, and carries out the power interruption notification possibility determination based on the power interruption notification possible time.

3. The communication system according to claim 2, wherein when both of a transmitting unit and a receiving unit of the transmitting and receiving unit can be set in the power saving state, the subscriber-side control unit transmits, as the start up time in the power saving return information, a reception-side startup time, which is a startup time of the receiving unit, and a transmission-side startup time, which is a startup time of the transmitting unit, and the station-side control unit sets, as the power interruption notification possible time, a value obtained by subtracting a larger one of the transmission-side startup time and the reception-side startup time from the power holding time.

4. The communication system according to claim 2, wherein the station-side control unit notifies, at every band update cycle, the optical network unit of transmission permission information in which a result of the band allocation is stored and carries out the power interruption notification possibility determination based on the power interruption notification possible time and the band update cycle.

5. The communication system according to claim 4, wherein the station-side control unit notifies, at every band update cycle, the optical network unit in the power saving state of the transmission permission information in which a band allocation result for transmission of a band request is stored.

6. The communication system according to claim 4, wherein the station-side control unit stops the transmission of the transmission permission information to the optical network unit in the power saving state and further carries out the power interruption notification possibility determination based on duration of the power saving state of the optical network unit.

7. The communication system according to claim 4, wherein, when a plurality of the band update cycles can be set, if a result of the power interruption notification possibility determination based on at least one band update cycle among the settable band update cycles indicates that the power interruption notification is possible, the station-side control unit sets the band update cycle to a value for enabling the power interruption notification.

8. The communication system according to claim 1, wherein the optical network unit transmits, to the optical line terminal, mode information indicating which of three modes concerning the power saving state the optical network unit is adapted or whether the optical network unit is not adapted to the power saving state, the three mode including a mode for setting the transmitting unit of the transmitting and receiving unit in the power saving state, a mode for setting both of the receiving unit and the transmitting unit in the power saving mode, and a mode for setting the receiving unit in the power saving state, and the station-side control unit stores, as determination criteria, correspondence among values of the mode information, determination results of the power interruption notice possibility determination, and the modes to be set and determines, referring to the determination criteria, a mode to be set based on the power saving information received from the optical network unit and a determination result of the power interruption notification possibility determination for the optical network unit.

9. The communication system according to claim 1, wherein the optical network unit further includes an environment-parameter detecting unit configured to detect, when the power holding time changes depending on a predetermined environment parameter, the environment parameter, and when determining that the environment parameter is not within a predetermined range, the subscriber-side control unit notifies the optical line terminal that the environment parameter is not normal and, when the environment parameter returns to the predetermined range, the subscriber-side control unit notifies the optical line terminal that the environment parameter is normal.

10. A communication system comprising: optical network units; and an optical line terminal configured to allocate bands to the optical network units, wherein at least one of the optical network units includes:

a power-interruption detecting unit configured to detect power interruption of the optical network unit;

a transmitting and receiving unit capable of being set in a power saving state;

and a subscriber-side control unit configured to notify the optical line terminal of a power interruption notification possible time, which is a value obtained by subtracting a startup time, which is time until the transmitting and receiving unit returns from the power saving state, from a power holding time during power interruption occurrence of the optical network unit, and, when the power-interruption detecting unit detects the power interruption, transmit a power interruption notification to the optical line terminal, and the optical line terminal includes a station-side control unit configured to determine, based on the power interruption notification possible time, whether the optical network unit at a transmission source of the power interruption notification possible time can transmit the power interruption notification when the power interruption occurs in the power saving state.

11. The communication system according to claim 10, wherein the station-side control unit notifies, at every band update cycle, the optical network unit of transmission permission information in which a result of the band allocation is stored and carries out the power interruption notification possibility determination based on the power interruption notification possible time and the band update cycle.

12. The communication system according to claim 11, wherein the station-side control unit notifies, at every band update cycle, the optical network unit in the power saving state of the transmission permission information in which a band allocation result for transmission of a band request is stored.

13. The communication system according to claim 11, wherein the station-side control unit stops the transmission of the transmission permission information to the optical network unit in the power saving state and further carries out the power interruption notification possibility determination based on duration of the power saving state of the optical network unit.

14. The communication system according to claim 11, wherein, when a plurality of the band update cycles can be set, if a result of the power interruption notification possibility determination based on at least one band update cycle among the settable band update cycles indicates that the power interruption notification is possible, the station-side control unit sets the band update cycle to a value for enabling the power interruption notification.

15. The communication system according to claim 10, wherein the optical network unit transmits, to the optical line terminal, mode information indicating which of three modes concerning the power saving state the optical network unit is adapted or whether the optical network unit is not adapted to the power saving state, the three mode including a mode for setting the transmitting unit of the transmitting and receiving unit in the power saving state, a mode for setting both of the receiving unit and the transmitting unit in the power saving mode, and a mode for setting the receiving unit in the power saving state, and the station-side control unit stores, as determination criteria, correspondence among values of the mode information, determination results of the power interruption notice possibility determination, and the modes to be set and determines, referring to the determination criteria, a mode to be set based on the power saving information received from the optical network unit and a determination result of the power interruption notification possibility determination for the optical network unit.

16. The communication system according to claim 10, wherein the optical network unit further includes an environment-parameter detecting unit configured to detect, when the power holding time changes depending on a predetermined environment parameter, the environment parameter, and when determining that the environment parameter is not within a predetermined range, the subscriber-side control unit notifies the optical line terminal that the environment parameter is not normal and, when the environment parameter returns to the predetermined range, the subscriber-side control unit notifies the optical line terminal that the environment parameter is normal.

17. A communication control method in a communication system including optical network units and an optical line terminal configured to carry out band allocation to the optical network units, the communication control method comprising:

a first step in which at least one of the optical network units notifies the optical line terminal of, as power saving return information, a power holding time during occurrence of power interruption of the optical network unit and a startup time, which is time until a transmitting and receiving unit of the optical network unit returns from a power saving state;

a second step in which the optical network unit transmits, when detecting the power interruption of the optical network unit, a power interruption notification to the optical line terminal; and a third step in which the optical line terminal carries out, based on the power saving return information, power interruption notification possibility determination, which is determination of whether the optical network unit at a transmission source of the power saving return information can transmit the power interruption notification when the power interruption occurs in the power saving state.

* * * * *